United States Patent [19]

Bellamy

[11] 3,914,437

[45] Oct. 21, 1975

[54] OSMOTIC PRESSURE CONTROL TO IMPROVE THERMOPHILIC MICROORGANISM GROWTH

[75] Inventor: Winthrop D. Bellamy, Schenectady, N.Y.

[73] Assignee: General Electric Company, Schenectady, N.Y.

[22] Filed: Apr. 30, 1974

[21] Appl. No.: 465,507

[52] U.S. Cl. ............... 426/53; 195/117; 210/11; 426/56
[51] Int. Cl.² ............................ A12K 1/00
[58] Field of Search ......... 195/8, 33, 39, 104, 108, 195/80 R, 114, 81, 82, 91, 96, 117; 210/11, 15, 51, 54; 426/49, 52, 53, 56

[56] References Cited
UNITED STATES PATENTS

| | | | |
|---|---|---|---|
| 3,420,744 | 1/1969 | Noguchi et al. | 195/114 |
| 3,462,275 | 8/1969 | Bellamy | 426/53 |
| 3,838,198 | 9/1974 | Bellamy et al. | 426/53 |

*Primary Examiner*—A. Louis Monacell
*Assistant Examiner*—R. B. Penland
*Attorney, Agent, or Firm*—Jane M. Binkowski; Joseph T. Cohen; Jerome C. Squillaro

[57] ABSTRACT

A method is described by which the osmotic pressure (of the medium in which thermophilic cellulolytic and ligninolytic microorganisms are grown on biodegradable organic waste material containing cellulose) is controlled in order to stimulate cell mass growth and cellulose digestion. Increase of osmotic pressure is controllably effected by providing a concentration of inorganic salt in the medium to the extent desired. Sodium chloride and soluble phosphate are exemplary salts.

6 Claims, No Drawings

OSMOTIC PRESSURE CONTROL TO IMPROVE THERMOPHILIC MICROORGANISM GROWTH

BACKGROUND OF THE INVENTION

Much research and development effort has been, and is now being, expended in the development of processes for the treatment of solid, organic, biodegradable waste materials. In general, these processes have the minimum objective of reducing pollution of the environment and some of these processes are employed to convert these wastes to useful products, e.g. animal feed supplements.

Among the most promising of these developments in waste conversion is the process described in U.S. Pat. No. 3,462,275 — Bellamy (incorporated by reference), wherein thermophilic microorganisms are employed to convert cellulose-containing wastes into cellular proteinaceous materials, preferably pasteurized, useful as animal feed supplements and as sources of extractable proteins. The Bellamy invention in addition to having utility in the treatment of industrial wastes and domestic and municipal sewage has particular application to the solution of a serious problem that has developed from present-day trends of feeding dairy and beef cattle, while they are kept in confinement within enclosures. The development of mechanized and specialized large stock feed lot enterprises has created a serious animal waste disposal problem, particularly because of the contamination of surface water with nutrients from these wastes. This problem is reviewed in a study "Pollution Implications of Animal Wastes — A Forward Oriented Review" prepared by Dr. Raymond C. Lochr for the United States Department of the Interior (July 1968).

DESCRIPTION OF THE INVENTION

The term "animal waste" as employed herein is the composite of the animal feces, bedding material (e.g. straw) and urine, which has usually soaked into the bedding material.

It has been discovered that the growth and activity of many cellulolytic and/or ligninolytic Thermoactinomyces can be stimulated by establishing and maintaining the osmotic pressure of the liquid medium within certain limits. Increase in the osmotic pressure, when necessary, is achieved by providing in the liquid medium a quantity of a non-toxic inorganic salt. The osmotic pressure to be established and maintained is that which would be produced in the given liquid medium in the pure state by the addition thereto of sodium chloride (or other salt with equal osmotic effect) in a quantity in the range of from greater than about 0.5% by weight to less than about 3.3% by weight. The desired control of osmotic pressure may be effected by the addition to the system of a salt soluble in the medium or by the generation of such a salt in the medium by chemical reaction. Exemplary salts are sodium phosphate, potassium phosphate and sodium chloride.

MANNER AND PROCESS OF MAKING AND USING THE INVENTION

In a process in which biodegradable organic waste material containing cellulose and/or lignin in an aqueous system is acted upon by thermophilic microorganisms in a stirred fermentor, or growth chamber, a determination is made of the salt content of the system. If the material analysis (determination of copper, manganese, magnesium, iron, sodium, potassium, chlorine, phosphate, sulfate, etc.) establishes that the osmotic pressure of the medium is less than would be produced by 0.5% by weight (0.086 moles) of sodium chloride (regardless of the particular salts present), the inorganic salt concentration must be increased. This can be accomplished preferably before growth is initiated by increasing the concentration of waste (e.g. animal waste) in the system, if it is the kind of waste containing significant amounts of salt, or by directly adding salt to the system.

Once the proper conditions of osmotic pressure, pH, temperature and oxygen concentration have been established, the biodegradation process and consequent cellular growth proceeds. The requisite salt concentration may be maintained by recycling an appropriate portion of the supernatant broth (separated from the cellular product mass). If the osmotic pressure of the medium approaches the maximum allowable (i.e. the osmotic pressure that would be produced in the aqueous system by the presence of about 3.3% by weight or 0.568 moles of sodium chloride), further recycling of supernatant will have to be discontinued and dilution may even be necessary.

The salt content of some waste materials (e.g. paper mill waste, municipal waste) is very low while the salt content of other waste materials, such as feedlot wastes is unpredictable. Thus, control and monitoring are necessary to establish and maintain the osmotic pressure of the medium in the proper range to facilitate the growth and activity of cellulolytic and/or ligninolytic Thermoactinomyces.

Recirculation of the supernatant to the extent conducive to the proper osmotic pressure has definite advantages, e.g. conservation of water, conservation on salt input, at least a partial solution to the problem of disposing of the salts.

The operating conditions in the fermentor are: pH in the range of from about 7.0 to about 8.5, temperature in the 45°–80°C range and oxygen to the extent of 0.3 to 2.0 mg. per liter.

EXAMPLE 1

Culture Y11 of Thermoactinomyces digested 94% of the added cellulose fiber in an aqueous medium containing 3% by weight sodium chloride, while the control (about 0.05% by weight sodium chloride present in the fiber) organism digested only 30% by weight of the added cellulose.

EXAMPLE 2

Culture Y14 of Thermoactinomyces grown in an aqueous medium containing 3% by weight sodium chloride, digested 82% by weight of the added cellulose, while the control, the same organism in a solution containing about 0.05% by weight sodium chloride digested only 7% by weight of the added cellulose.

In those instances in which a soluble phosphate (e.g. sodium phosphate, potassium phosphate) is provided in the liquid medium for the purpose of this invention, some or all of the soluble phosphate content of the broth can be removed after the separation step by precipitation by the addition of limestone thereto to produce calcium phosphate. The calcium phosphate is a desirable component of fertilizer.

BEST MODE CONTEMPLATED

Part of the requisite salt content can be generated in the aqueous medium as by chemical treatment of the waste. Thus, in the case of cow manure, a suspension (10% by weight) of cow manure was treated (heating for 2 hours at 85°C) with 0.5% (by weight) solution of sodium hydroxide. The pH was adjusted to the 7.5–7.8 range by the addition of phosphoric acid simultaneously providing phosphate salts. Requisite mineral medium was added to provide minute amounts of Mg, Mn, Fe, Ca, K, $SO_4^{--}$, $Cl^-$, etc. Ammonia was introduced as a source of nitrogen. Control of osmotic pressure was accomplished by adjusting the phosphate salt content to 1½% by weight. Additional salt content, when desired, was accomplished by the introduction of sodium chloride, the sum of the osmotic pressure effects in the system not exceeding the equivalent osmotic pressure that would be produced by 3.3% by weight of sodium chloride in pure water.

The mixture (1–2% by weight of manure) was fermented with cellulolytic Thermoactinomyces and the cell mass was harvested. Some of the supernatant broth was recirculated and the rest was discarded.

What I claim as new and desire to secure by Letters Patent of the United States is:

1. In the method for growth of cellulolytic and ligninolytic Thermoactinomyces in an aqueous liquid medium in a fermentor on biodegradable organic waste material containing cellulose and/or lignin in the presence of requisite mineral salts at a temperature in the range of 45°C to 80°C, a pH in the range of from about 7.0 to about 8.5 and an oxygen concentration of 0.3 to 2.0 mg. per liter, the improvement comprising establishing and maintaining the osmotic pressure of said aqueous liquid medium in said fermentor at a value in the range between the osmotic pressure that would be induced at said temperature in pure water by the dissolution therein of 0.5% by weight of sodium chloride and the osmotic pressure that would be induced at said temperature in pure water by the dissolution therein of 3.3% by weight of sodium chloride.

2. The improvement of claim 1 wherein the osmotic pressure is established and maintained by the addition to the medium of a salt selected from the group consisting of sodium chloride and soluble phosphate salts.

3. The improvement of claim 2 wherein the salt is sodium chloride.

4. The improvement of claim 1 wherein a salt is generated in situ in the medium.

5. The improvement of claim 1 wherein the osmotic pressure is established and maintained by the addition to the medium of a combination non-toxic inorganic salts.

6. The improvement of claim 5 wherein sodium chloride and a soluble phosphate salt are used in combination.

* * * * *